United States Patent
Gasset Lázaro

(10) Patent No.: US 11,304,424 B2
(45) Date of Patent: Apr. 19, 2022

(54) METHOD AND APPARATUS TO PROCESS GRAIN PROCESS GRAIN RECEIVED FROM A DRYER

(71) Applicant: LAW Iberica S.A., Burgos (ES)

(72) Inventor: Jaime Gasset Lázaro, Madrid (ES)

(73) Assignee: LAW IBERICA S.A., Burgos (ES)

( * ) Notice: Subject to any disclaimer, the term of this patent is extended or adjusted under 35 U.S.C. 154(b) by 0 days.

(21) Appl. No.: 17/460,826

(22) Filed: Aug. 30, 2021

(65) Prior Publication Data

US 2022/0087273 A1   Mar. 24, 2022

Related U.S. Application Data

(60) Provisional application No. 63/080,414, filed on Sep. 18, 2020.

(51) Int. Cl.
| | | |
|---|---|---|
| *A23B 9/08* | (2006.01) | |
| *F26B 25/00* | (2006.01) | |
| *F26B 21/00* | (2006.01) | |

(52) U.S. Cl.
CPC ............ *A23B 9/08* (2013.01); *F26B 21/001* (2013.01); *F26B 25/002* (2013.01); *F26B 2200/06* (2013.01)

(58) Field of Classification Search
CPC ... F26B 21/001; F26B 25/002; F26B 2200/06
See application file for complete search history.

(56) References Cited

U.S. PATENT DOCUMENTS

| | | | | |
|---|---|---|---|---|
| 2,560,141 | A | | 7/1951 | Tipps |
| 3,701,203 | A | | 10/1972 | Anderson |
| 3,714,718 | A | * | 2/1973 | Sukup ............... F26B 25/22 34/573 |
| 4,076,492 | A | * | 2/1978 | Alms ............... F26B 17/122 34/174 |
| 4,599,809 | A | * | 7/1986 | Parkes ............... F26B 25/22 34/484 |
| 5,551,167 | A | * | 9/1996 | van Fossen ......... F26B 17/14 34/168 |
| 6,244,054 | B1 | | 6/2001 | Melchinger |
| 9,347,904 | B1 | * | 5/2016 | Schaefer, Jr. ....... F26B 25/22 |
| 9,738,845 | B2 | * | 8/2017 | Gibbel ............... F26B 3/14 |
| 9,885,520 | B1 | * | 2/2018 | Abbasi ............... F26B 3/04 |
| 2006/0168843 | A1 | * | 8/2006 | Zlotos ............... F26B 17/14 34/482 |
| 2014/0165854 | A1 | * | 6/2014 | Green ............... B02B 5/00 99/468 |
| 2014/0250717 | A1 | * | 9/2014 | Bloemendaal ....... F26B 25/002 34/487 |

(Continued)

FOREIGN PATENT DOCUMENTS

| | | |
|---|---|---|
| CN | 204811114 | 12/2015 |
| ES | 1017044 | 12/1991 |

(Continued)

*Primary Examiner* — David J Laux
(74) *Attorney, Agent, or Firm* — Duane Morris LLP; Gregory M. Lefkowitz; Randall C. Pyles

(57) ABSTRACT

A method of processing grain from a dryer includes maintaining a transition zone within a volume of received grain, the transition zone being a cross section of the volume of the received grain that is at a same temperature, by cooling and drying the received grain; and extracting cooled grain.

17 Claims, 4 Drawing Sheets

(56) References Cited

U.S. PATENT DOCUMENTS

2017/0081605 A1* 3/2017 Gibbel .................... F26B 23/02
2019/0137178 A1* 5/2019 Ma ........................... F26B 5/04

FOREIGN PATENT DOCUMENTS

| FR | 821091 | 11/1937 |
| FR | 2367259 | 5/1978 |
| FR | 2491723 | 4/1982 |
| FR | 2605851 | 5/1988 |
| JP | S6188846 | 5/1986 |
| JP | H11206591 | 8/1999 |
| JP | 2004322015 | 11/2004 |
| WO | 2017207817 | 12/2017 |

* cited by examiner

METHOD AND APPARATUS TO PROCESS GRAIN PROCESS GRAIN RECEIVED FROM A DRYER

CROSS REFERENCE TO RELATED APPLICATIONS

This application claims the benefit of U.S. Provisional Patent Application No. 63/080,414 filed Sep. 18, 2020, which is hereby incorporated by reference for all purposes as if fully set forth herein.

FIELD OF THE DISCLOSURE

The present disclosure relates to cereal processing, and specifically to processing of grain received from a dryer, by slow cooling and supplemental extraction of moisture.

The present disclosure more specifically refers to a method and apparatus of processing grain received from a dryer, of the kind that performs slow, deferred, and continuous cooling, and extraction of the grain's residual moisture, that is performed in a single tower or structure.

DESCRIPTION OF THE RELATED ART

In the field of grains and cereals and the processes applied to cereal, a conventional procedure is to dry the collected grain in order to remove the moisture existing in the grain before it is stored. This drying operation is usually performed in dryers that are operating continuously, introducing the grain through one portion of the dryer, typically at the top, and removing it through another portion, typically at the bottom.

In conventional systems, there are means designed so that hot air is introduced into the dryer first, in one or more upper sections, and then cold air is introduced into the bottom section, in order to cool the grain before it is extracted from the dryer. Such a procedure is described for example in document FR2367259A.

A procedure is also known whereby, in a general type of dryer, at least one section is reserved so that no circulation of air occurs to form a zone of rest. In the zone of rest, the transmitted heat will be transmitted to the grain to make the temperature of the grain rise.

During this period, moisture inside the grain moves towards the external surface of the grain, which aids the drying process. However, compared with the time that the grain remains in a dryer, the time for which the grain remains in this zone of rest is very short, and is too brief to allow sufficient migration of the moisture of the grain towards the external surface, to obtain the required degree of drying by the effect of the cooling air alone. Documents FR821091A and U.S. Pat. No. 3,701,203A describe this procedure.

A procedure of removing grain that is not completely dry and that is still hot from a dryer is also known. In this case, the residual heal contained in the grain upon leaving the dryer is used to complete the drying, allowing the grain to rest in a unit separate from such dryer. During this rest period the grain's internal moisture migrates from its inside to its periphery. The phenomenon that occurs can be compared to the one that takes place in the zone of rest of a dryer such as the one mentioned in the preceding paragraph, but in this case the duration is quite long, which allows the moisture to migrate more fully to the outside of the grain and, as a consequence, extraction of this moisture is simplified. After this migration, the grain only has to be ventilated with a weak renewed flow of air to complete the drying process and perform the cooling process, using the significant heat of the grain, as described for example in document U.S. Pat. No. 2,560,141 A. This procedure is known as deferred slow cooling, and it also provides more homogeneous and effective drying while not having to use the air flow in the existing dryers, a reduction in energy consumption, and an improvement in the quality of the dried grain. However, in its present application, this procedure has some problems in that it needs to employ several silos equipped with a deferred slow cooling system to be able to keep up the pace with the operating pace of a continuous dryer. Also, the operation must be rigorously controlled to maintain the necessary stages, which requires specialized training of personnel.

Another process, taught in document FR2491723A, is the continuous deferred slow cooling of grain extracted from a dryer through a progressive descent of the grain in a column. The grain is first introduced in an unventilated rest zone for a sufficient time to allow the internal moisture of the grain to migrate from the interior to the periphery, and then in a zone ventilated with a weak flow of cold air to complete the drying and cool the grain that is then extracted from the base of the column. With this continuous deferred slow cooling procedure, it is necessary to prevent, approximately halfway in the column, condensation by using ducts to evacuate the moisture-laden cooling air.

It is therefore desirable to have a method and apparatus for processing grain extracted from a dryer in order to cool it and to extract the residual moisture while avoiding the problems with the conventional systems.

SUMMARY OF THE DISCLOSURE

One embodiment of this disclosure is a method for processing grain input from a dryer, the method of the kind that performs slow, deferred, and continuous cooling, and extraction of the grain's residual moisture.

The method includes operations at the following stages as the grain moves through a single silo, tower, or structure:

Loading the grain discharged from the dryer at a first stage, this can be in a top portion of the tower or in any portion that can receive the grain.

Resting and homogenizing the grain, in which moisture inside the grain is removed by capillary action to the outside of the grain, in a second stage.

Cooling and drying, in which the grain is cooled and dried by intermittent forced ventilation with air at a ventilation temperature, at a third stage.

Discharging dried and cooled grain through a portion of the tower, that can be a bottom portion or any portion that can output the grain, to be ready for subsequent processing at a fourth stage.

In a method of the current disclosure, the second stage and the third stage are separated by a transition zone that is in a section of grain inside the tower. The transition zone is a cross section of the volume of grain, approximately 1 M high, of grain about the same temperature where the greatest exchange of heat transfer occurs between the grain and the ventilation air provided by the ventilation system. The transition zone is physically driven in one direction by the ventilation system and in an opposite direction by an extractor of the grain, both of which can be located in the same portion of the tower, and controlled by a controller.

In an embodiment, the method of processing grain from a dryer, includes maintaining the transition zone within a volume of received grain, the transition zone being a cross section of the volume of the received grain that is at a same temperature, by cooling and drying the received grain; and extracting cooled grain.

In the embodiment, the maintaining the transition zone further include maintaining a level of the received grain within predetermined locations in a tower; controlling a ventilation system to provide ventilation air to cool and dry the received grain; and controlling an extractor to extract the cooled grain from the tower. The transition zone is moved between a first position at a first location of a first temperature sensor and a second position at a second location of a second temperature sensor.

In a configuration, the transition zone is located between an upper position where there is an upper temperature sensor, and a lower position where there is a lower temperature sensor. The temperature sensors are connected to the controller. In this configuration, when the transition zone reaches the upper position, it provides a temperature to the upper temperature sensor such that it sends a signal to the controller, which then stops the ventilation system. Similarly, when the transition zone reaches the lower position, it provides a temperature to the lower temperature sensor so that this sends a signal to the controller, which then stops the extractor.

The terms 'upper' and 'lower' refer to a configuration where the tower is vertically oriented and the grain moves from top to bottom. In this description, these terms are used interchangeably with 'first' and 'second' referring to the grain inlet and extraction sides of the tower, respectively.

The formation of the transition zone is known as "migration," which refers to the internal displacement of the internal moisture and temperature of the grain, and it is defined by the gradient of temperature and the moisture of the grain and at a rate that depends on the particular grain, and on the flow of a ventilation system. If the ventilation system stops, the internal gradients continue, so the displacement of the transition zone continues. When equilibrium of the internal moisture and the internal temperature of the grain is achieved, the transition zone stops. These internal movements in the grain (migration) are known as "tempering," and they continue when the ventilation stops. When the ventilation stops, the external exchanges stop, but without the internal gradients disappearing (diffusiveness), which gradually stop at a decreasing rate. Therefore, while the ventilation is working, the external gradients (due to the air) and internal gradients (in the grain itself) remain active, and the migration (internal displacement of the moisture and the temperature in the grain) does not stop and is uniform. But if the ventilation stops for any reason the exchanges of heat and moisture outside the grain disappear first, because such ventilation has stopped, but the internal exchanges (migration) continue, no longer uniformly, but decreasing as has been mentioned, until they too stop. This circumstance must be taken into account in the cooling process of the grain. In summary, in the case of forcing, manually or automatically, the "rest" period of the grain, the response of the gradient of the exterior exchanges of the grain is rapid, and more progressive (slower) in the case of internal exchanges, whose migration is much slower, because of its "diffusiveness."

Therefore, the transition zone is moved by the ventilation, as cooler grain reaches the first temperature sensor. The first temperature sensor sends the temperature to the controller, and this stops the ventilation system. Moreover, if the extractor is started, the whole mass of grain moves successively, in First-In, First-Out (FIFO) fashion, and the transition zone of grain with the same temperature is moved with the grain, until it reaches the second temperature sensor. The second temperature sensor sends the temperature to the controller, and this stops the extractor.

This grain-processing method is a drying process, as the insufflated air is heated as it passes through the mass of the grain, and evaporates the moisture in such grain with the available heat, until a new air-grain equilibrium is reached. This thermodynamic equilibrium is a function of various factors, such as climate, microorganisms, the grain, or any natural or forced cause. And specifically, and as has been mentioned previously, in this procedure there are two drying processes to take into account: that of the existing dryer, which is external, and where the grain has been extracted before the procedure of the present disclosure is carried out, and the "internal drying" process, which is the process performed jointly by the ventilation system and the grain's own internal gradients and control by the disclosed process and apparatus.

The loading of the grain in the tower is controlled by the controller, through a first level detector and a second level detector that are located in one portion of the tower and are connected to the controller, such that the first level detector sends a signal to the controller when the grain level reaches the first level detector, and the controller stops loading grain in the tower. It should be understood that the tower could be but need not be vertically oriented and the grain need not move in a downward direction. The tower can be oriented horizontally or in any suitable configuration and the grain can be moved horizontally or along any suitable path. Also, the second level detector sends a signal to the controller when the grain level falls to the second level detector, and the controller activates the loading of grain in the tower from the dryer.

According to an embodiment of the invention, in the first stage of loading, the grain enters the tower at a temperature of about 60° C. with moisture at about 17.7%.

In addition, according to an embodiment of the invention, in the fourth stage of discharge, the grain is discharged from the tower at a temperature of about 10° C. with moisture at about 15%.

According to all of the foregoing, one of the main advantages of this invention is providing a method of deferred slow cooling of the grain extracted from the dryer, as well as a more homogeneous and effective drying, with a saving of air flow in the existing dryers, a reduction in energy consumption, all of which also prevents moisture condensation inside the tower, thereby achieving an improvement in the quality of the grain.

Another embodiment of the disclosure is an apparatus to process the grain extracted from a dryer, the apparatus of the kind that performs slow, deferred, and continuous cooling, and extraction of the grain's residual moisture, in which the grain-processing method described previously is carried out.

In a configuration, the apparatus can include a single tower that includes an inlet in the top portion of the tower to load the grain extracted from the dryer, and an outlet (i.e. extractor) in the bottom portion of the tower to discharge the grain once it has been cooled and the moisture has been extracted. Additionally, the tower can include in the bottom portion an extractor to extract the grain, and a ventilation system to provide ventilation air in an upward direction. The ventilation system can be located in a false bottom in the bottom portion of the tower. The extractor and the ventilation system are both controlled by a controller.

In an embodiment, the apparatus to process grain from a dryer incudes a tower to receive the grain from the dryer; a control system including a controller, position sensors in communication with the controller to sense levels of the received grain at various locations within the tower, and temperature sensors in communication with the controller to sense temperatures of the received grain at various locations within the tower; a ventilation system to cool and dry the received grain; and an extractor to extract cooled grain from the tower, wherein the control system controls the ventilation system and the extractor to maintain a transition zone within a volume of received grain, the transition zone being a cross section of the volume of the received grain that is at a same temperature.

To be able to carry out the described functions, the apparatus can include an first temperature sensor and a second temperature sensor, both connected to the controller and configured to send continuous temperature readings or a signal to the controller when the grain reaches a certain temperature. This will be the case when the transition zone, which has a certain temperature, reaches the first temperature sensor and the second temperature sensor during its movement. Upon receiving the signal from the first temperature sensor, the controller will stop the ventilation system, whereas upon receiving the signal from the second temperature sensor, the controller will stop the grain extractor.

According to an embodiment, the tower of the apparatus can include a first level detector and a second level detector, both located in a portion of the tower and connected to the controller. These detectors are configured to send a signal to the controller when the grain level reaches them, such that, according to the method described previously, when the grain level reaches the first level detector, such detector sends a signal to the controller that stops loading the grain into the tower. Also, when the grain level reaches the second level detector, the second level detector sends a signal to the controller to activate the grain discharge from the dryer.

Additionally, the apparatus can include a nozzle located in the top portion of the tower for air to exit.

The ventilation system can include a heater or a cooler to condition the ventilation air temperature within a predetermined or dynamic operating range.

In an embodiment, a control system to process grain from a dryer includes a controller; a plurality of temperature sensors each providing a temperature at a location within a volume of received grain from the dryer to the controller; a ventilation system to provide cooling air to the received grain; and an extractor to extract cooled grain from the volume of received grain, wherein the control system controls the ventilation system and the extractor based on temperatures provided by the plurality of temperature sensors to maintain a transition zone within the volume of received grain, the transition zone being a cross section of the volume of the received grain that is at a same temperature.

The control system maintains the transition zone by maintaining a level of the received grain within predetermined locations within the tower, controls the ventilation system to provide ventilation air to cool and dry the received grain, and controls the extractor to extract the cooled grain.

The transition zone is moved in a direction within the volume of received grain by providing the ventilation air and in an opposite direction by extracting the cooled grain.

The control system stops the ventilation system when the transition zone reaches a first position sensed by a first position sensor, and the control system stops the extractor when the transition zone reaches a second position sensed by a second position sensor.

The control system controls receiving the grain from the dryer such that a temperature of the grain is within a first predetermined temperature range, and the control system controls extracting the cooled grain such that a temperature of the cooled grain is extracted within a second predetermined temperature range.

The controller processes temperatures of the received grain received by the temperature sensors at several locations within the volume of the received grain at periodic intervals.

The above and other features, elements, characteristics, steps, and advantages of the present invention will become more apparent from the following detailed description of preferred embodiments of the present invention with reference to the attached drawings.

BRIEF DESCRIPTION OF THE DRAWINGS

To facilitate understanding of the invention, for illustrative but not limitative purposes, below is a description of an embodiment of the invention that makes reference to a series of figures.

Figure 1:
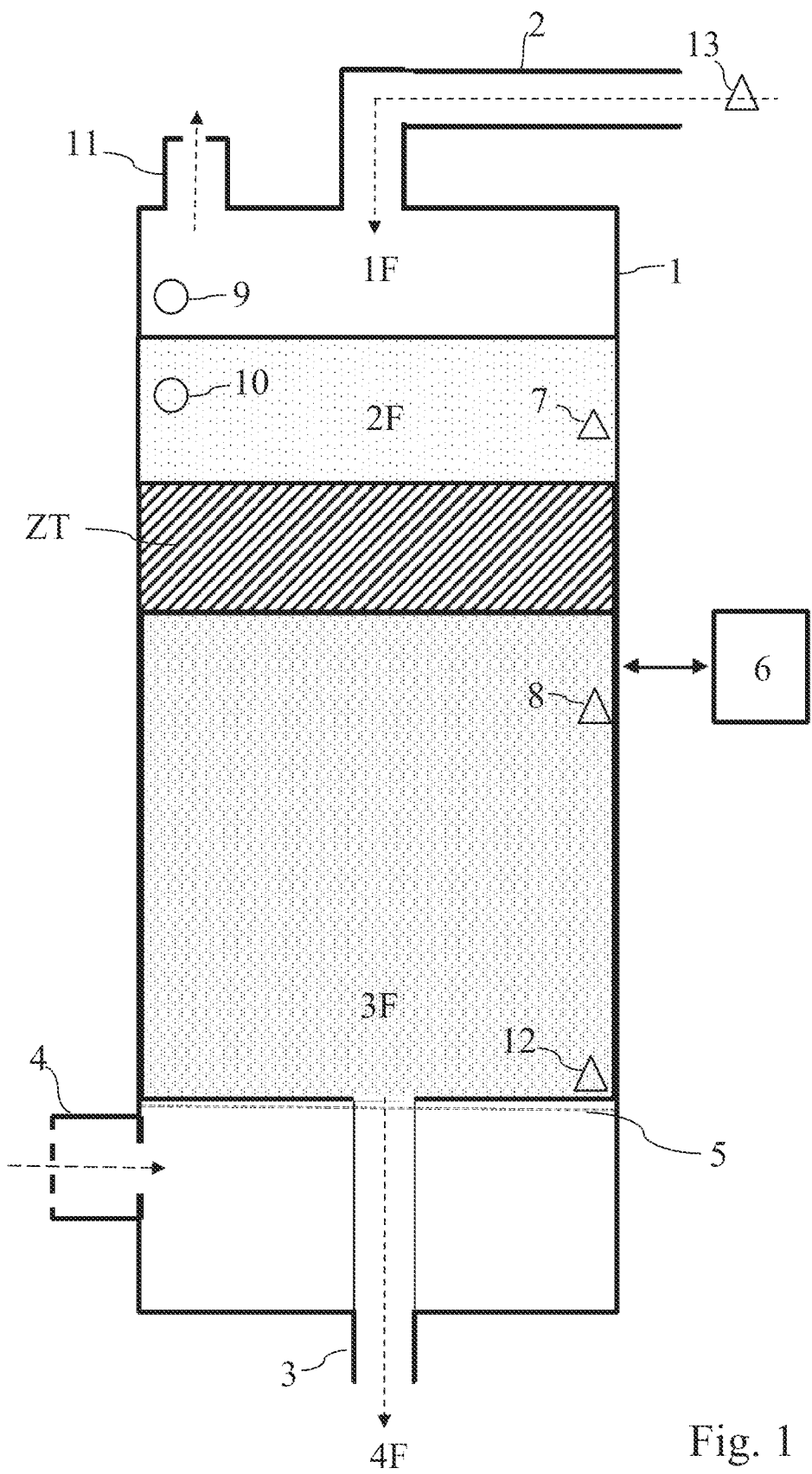
FIGS. 1-3 are block diagrams of a grain tower according to an embodiment of the present invention.

The figures make reference to a set of elements, namely:
1. tower
2. inlet
3. extractor
4. ventilation system
5. false bottom
6. controller
7. first temperature sensor
8. second temperature sensor
9. first level detector
10. second level detector
11. nozzle
12. grain outlet temperature sensor
13. grain inlet temperature sensor
1F. first stage
2F. second stage
3F. third stage
4F. fourth stage
ZT. transition zone

DETAILED DESCRIPTION OF THE EMBODIMENTS

An embodiment of this disclosure is a method for processing grain extracted from a dryer, of the kind that performs slow, deferred, and continuous cooling, and extraction of the grain's residual moisture.

With reference to FIG. 1, a method for processing grain includes the following operations at different stages or portions in a direction, in a single structure, silo, or tower 1:

Loading the grain discharged from the dryer through an inlet 2 in a portion of the tower 1 at a first stage F1.

In the first stage F1, the grain is transferred from an outlet in the dryer to the tower 1 by flowing the grain through the inlet 2 at a portion of the tower 1. This process takes into account the status of the exterior dryer, from which the grain to be processed is discharged, as "master" of the process, that is, the dryer output regulates the entry of grain into the tower 1 considering the grain temperature as provided by an inlet temperature sensor 13. This is why it must be assured that the capacity of the tower 1 for processing grain exceeds the quantity transferred from the dryer at all times.

Resting and homogenizing the grain, in which the water contained inside the grain is displaced by capillary action to the outside of the grains, at a second stage 2F.

The second stage F2 is where rest and homogenization, in a second portion of the tower 1, of the hot grain occurs with the residual moisture coming from the first stage F1. The grain is left for a period of "rest" (known as "tempering" among those knowing cereal production), also known as homogenization, in which the internal gradients of the grain are canceled out, as discussed above, migrating its heat and its moisture.

Cooling and drying, in which the grain is cooled and dried by directed and intermittent forced ventilation air, with the ventilation air at a ventilation temperature, at a third stage 3F. This forced ventilation air is provided by a ventilation system 4 that blows cooled ventilation air into the grain. The ventilation air forced through the grain can be discharged to the exterior, once the additional cooling and drying of the grain is done, through a nozzle 11 located in a portion of the tower 1.

Discharge of the dried and cooled grain, now ready for subsequent processing, such as cleaning by aspiration of the fine particles that accompany the grain that are often produced in the third stage, by an extractor 3 at a fourth stage 4F.

In this method, the second stage 2F and the third stage 3F are separated by a dynamic transition zone ZT that is moved through the inside of the tower 1. The transition zone ZT is driven in an input direction (e.g., upward or right) by the ventilation air from the ventilation system 4, and in an opposite output direction (e.g., downward or left) by the extractor 3. Both the ventilation system 4 and the extractor 3 can be located adjacent to each other in the tower 1 and are controlled by a controller 6. In the transition zone ZT is where the greatest exchange of heat occurs between the grain and the ventilation air provided by the ventilation system 4. Preferably, the transition zone ZT will have a thickness within the volume of the grain of approximately one meter.

As shown in FIG. 1, the transition zone ZT is preferably located between a first position (e.g., upper), in which an upper temperature sensor 7 is located, and another position (e.g., lower), in which a lower temperature sensor 8 is located. These temperature sensors 7 and 8 are connected to the controller 6, such that, when the transition zone ZT reaches the upper position, the upper temperature sensor 7 sends a control signal to the controller 6 that stops the ventilation system 4 to stop the temperature of the grain above that point from decreasing.

Figure 2:
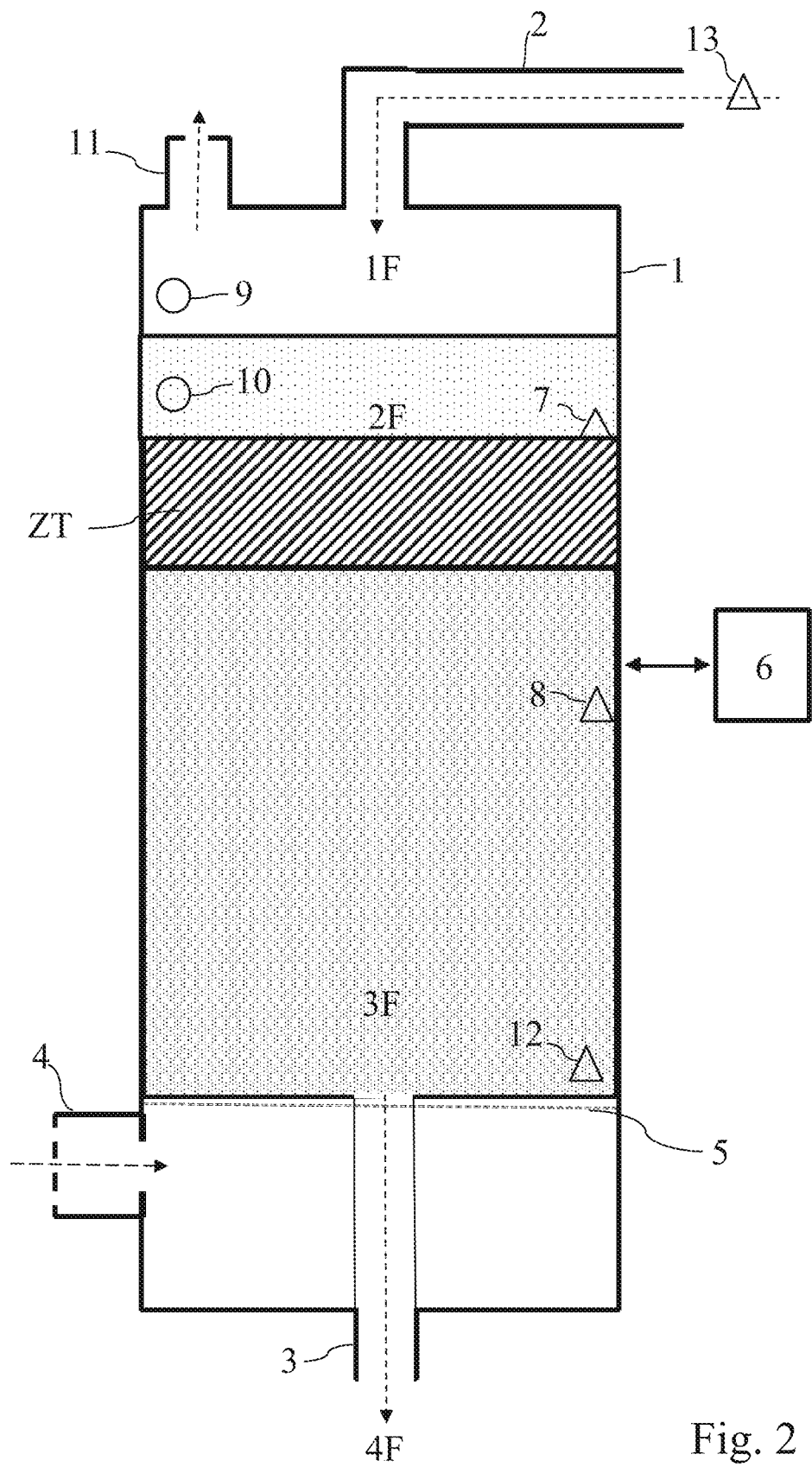
Figure 3:
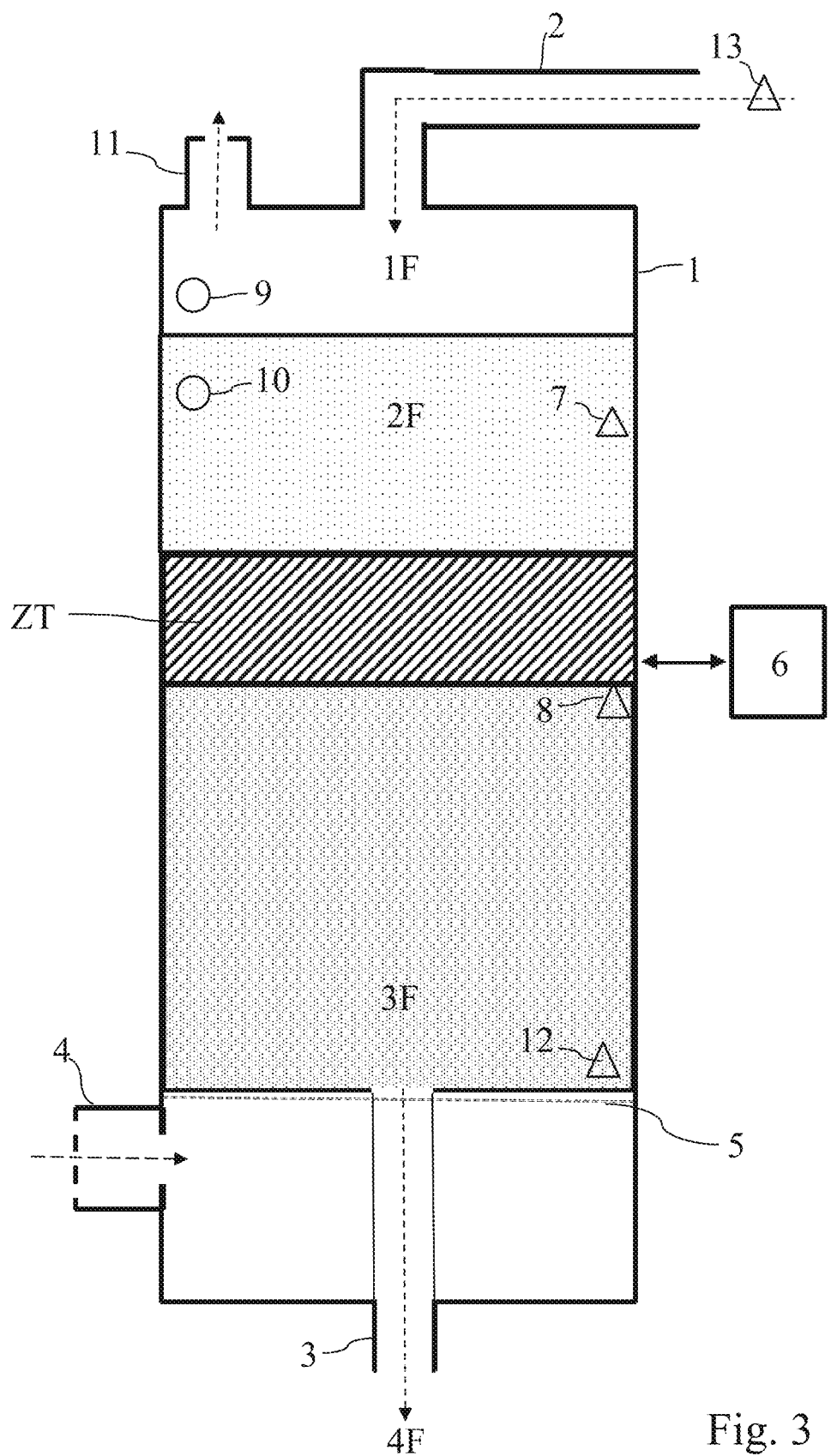
Figure 4:
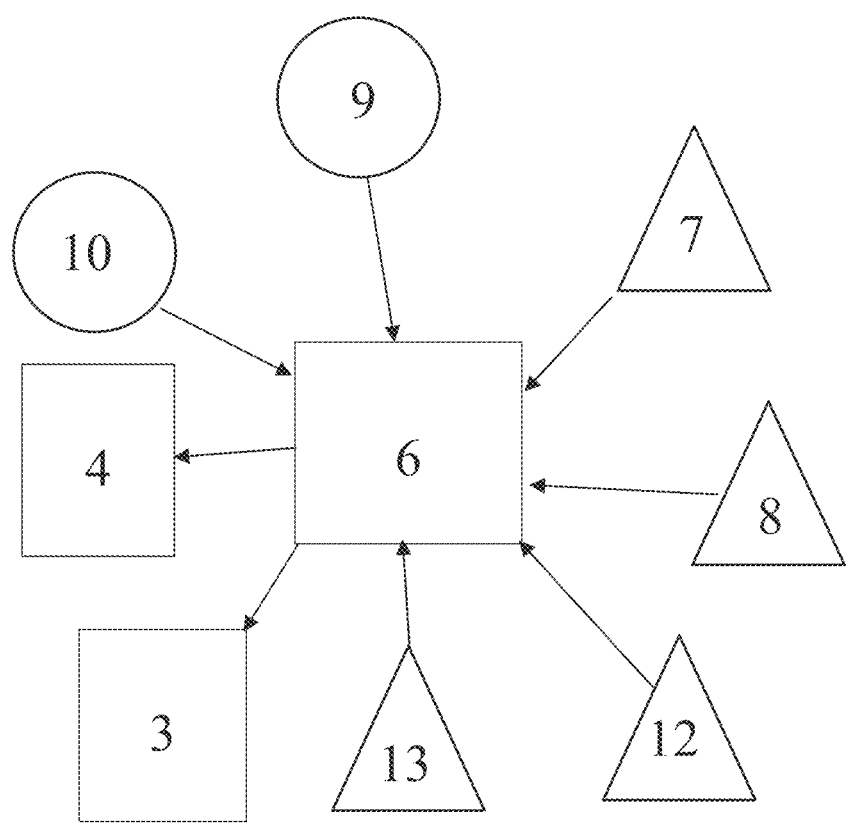
FIG. 4 is a block diagram of a control system according to an embodiment of the present invention.

When the transition zone ZT reached the first limit, as shown in FIG. 2, the transition zone ZT of grain with a similar temperature can be driven in an output direction by the extractor 3. The extractor 3 removes volume of cooled grain from the tower 1 outside the transition zone ZT and effectively moves the grain in the transition zone ZT. Conversely, when the transition zone ZT reaches the second position, as shown in FIG. 3, the lower temperature sensor 8 sends a signal to the controller 6 to stop the extractor 3. The ventilation system 4 and the extractor 3 are designed such that, when they are both activated, the transition zone ZT will receive a net movement and will slowly move.

Thus, the movement of the transition zone ZT can be alternating, between two "limits," which are the first and the second lower temperature sensors 7 and 8, where movement in an input direction will be caused by the ventilation system 4, and movement in an output direction will be caused by the extractor 3, all monitored and controlled by the controller 6.

In other words, the ventilation air driven by the ventilation system 4 is activated intermittently by the controller 6, as described above, moving the transition zone ZT in a direction. The extractor 3 is activated intermittently by the controller 6 moving the transition zone ZT in the opposite direction. Thus controlling the location of the transition zone ZT allows the ratio of the volumes occupied by the grain to be graduated, thereby improving the efficiency of the resting and homogenizing process.

Preferably, the loading of the grain in the tower 1 is controlled by the controller 6, through first level detector 9 and a second level detector 10, both located in a portion of the tower 1, as shown in FIG. 1. These level detectors 9 and 10 are connected to the controller 6 such that the first level detector 9 sends a signal to the controller 6 when the grain level reaches the first level detector 9, whereupon the controller 6 stops the grain input into the tower 1. Also, the second level detector 10 sends a signal to the controller 6 when the grain level reaches the second level detector 10, whereupon the controller 6 activates the grain input in the tower 1. The controller 6 sends signals to start and stop a grain conveyor (not shown) that transfers the grain from the dryer to the inlet 2 to control the grain quantity in the tower 1. In this way, the loading of grain in the tower 1 is automated by the two-level detectors 9 and 10.

The grain temperature at the inlet 2 can be between 55-65° C. as measured by temperature sensor 13. Preferably, the intake conditions of the grain into the tower 1 in the first stage F1 of loading are temperature of about 60° C. and moisture content at about 17.7%.

In addition, the grain temperature at the extractor 3 can be between 0-15° C. as measured by the grain outlet temperature sensor 12. Preferably, in the fourth stage F4 of discharge, the grain exits the tower 1 at a temperature of about 10° C. and with moisture at about 15%.

Another embodiment of the present invention includes an apparatus to process grain received from a dryer, of the kind that performs slow, deferred, and continuous cooling, and extraction of the grain's residual moisture, in which the grain-processing method described previously is carried out.

As the figures show, the apparatus can include a single tower 1, which in turn has an inlet 2 one portion to receive grain extracted from an external dryer, and an extractor 3 in another portion of the tower 1 to discharge the grain once it has been cooled and the moisture has been extracted. Also, the apparatus can include a ventilation system 4 that provides ventilation air to cool the grain. The extractor 3 and the ventilation system 4 can be located in the same (e.g. bottom) portion of the tower 1, and the ventilation system 4 can be situated below a false bottom 5 of the tower 1. Both the extractor 3 and the ventilation system 4 are controlled by the controller 6, which intermittently activates and stops them during the processing of the grain, as previously described.

The ventilation system 4 can include temperature and humidity conditioning to heat or cool and adjust the moisture content of the intake air to the ventilation system 4 to predetermine ranges before forcing the ventilation air into the tower 1.

FIG. 2 is a block diagram of a control system according to an embodiment of the present invention. As shown and previously described, the control system controls movement of the grain through the tower 1 and operation of rest and homogenization process. As shown, the control system can include a controller 6 that is in electronic communication with the extractor 3, the ventilation system 4, the first temperature sensor 7, the second temperature sensor 8, the first level detector 9, the second level detector 10, the grain outlet temperature sensor 12, and the grain inlet temperature sensor 13.

In an operating cycle the controller 6 can make periodic measurements or provide continuous monitoring of the various temperature and position sensors. For example, measurement can be taken for about a minute within a 10 to 20 minute interval. As previously described, grain enters the tower 1 from a dryer through the inlet 2. When grain reaches the first level detector 10, the controller 6 activates the ventilation system 4 to generate and output ventilation air into the tower 1 through the false bottom 5. The temperature of the grain in the second phase 2F does not vary much while the moisture contained in the grain is migrating from the core to the outside. In the third phase 3F, there is a more rapid cooling of the grain because it is exposed to a greater amount of air and is closer to the ventilation air.

In operation, the controller 6 works to maintain the following temperature conditions:

$T_1 = T_h - T_{i1}$ must be $\leq 10°$ C.

$T_2 = T_{i2} - T_s$ must be $\geq 15°$ C.

Where: $T_h$ is the grain inlet temperature measured at the grain inlet temperature sensor 13, and can vary between 55-65° C.; $T_{i1}$ is a first intermediate temperature of the transition zone and measured at the upper temperature sensor; $T_{i2}$ is a second intermediate temperature of the transition zone and measured at the second temperature sensor 8; and $T_s$ is the grain outlet temperature measured at the grain outlet temperature sensor 12, and can be in a range of 0-15° C.

The controller 6 continually operates according to the following cycle while measurements are made of the various position and temperature sensors in the tower 1 for approximately 1 minute every 10-20 minutes of operation. The grain enters the tower 1 from the dryer via the inlet 2. When the grain reaches the second level sensor 10, the ventilation system 4 starts to work. In the second phase F2 of the tower 1, the grain's temperature does not vary much and the moisture contained in it is leaving the core to the exterior surface of the grain. In the third phase 3F of the tower 1, there is a greater cooling of the grain due to the ventilation air. After operating for a period of time, about 10-20 minutes, the grain processing, including the inlet 2, the extractor 3, and the ventilation system 4, is stopped so that measurements can be performed.

If $T_1$ is $\leq 15°$ C. and $T_2$ is $\geq 15°$ C., the controller 6 controls the extractor 3 to start working. If $T_s$ is $\leq 15°$ C. and $T_1$ and $T_2$ are not met, the controller 6 controls the extractor 3 and the ventilation system 4 to work at the same time so that grain is discharged and so that, at the same time, the grain located in the third phase 3F is cooling down, moving the transition zone away from the extractor 3. In the event that neither $T_2$ nor $T_s$ are met, the controller 6 will control the ventilation system 4 to work, which will move the transition zone away from the extractor 3. After the activity time has elapsed, the measurements will be performed again, repeating the process.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A method of processing grain from a dryer, the method comprising:
    maintaining a transition zone within a volume of received grain in a tower, the transition zone being a cross-section of the volume of the received grain that is at a same temperature, by:
        sensing levels of the received grain at various locations within the tower;
        maintaining a level of the received grain within predetermined locations within the tower;
        measuring temperatures of the received grain at various locations within the tower;
        controlling a ventilation system to provide ventilation air to cool and dry the received grain; and
    controlling an extractor to extract the cooled grain from the grain tower.

2. The method of claim 1, wherein the transition zone is moved in a direction within the volume of received grain by providing the ventilation air and in an opposite direction by extracting the cooled grain.

3. The method according to claim 2, wherein the transition zone is moved between a first position at a first location of a first temperature sensor and a second position at a second location of a second temperature sensor.

4. The method according to claim 3, wherein
    when the transition zone reaches the first position, the providing the ventilation air is stopped, and
    when the transition zone reaches the second position, the extracting the cooled grain is stopped.

5. The method according to claim 1, wherein the grain is processed in first-in, first-out fashion.

6. The method according to claim 1, wherein
    a temperature of the grain from the dryer is received within a first predetermined temperature range, and
    a temperature of the cooled grain is extracted within a second predetermined temperature range.

7. The method according to claim 1, wherein a temperature of the received grain is measured at several locations within the volume of the received grain at periodic intervals.

8. An apparatus to process grain from a dryer, the apparatus comprising:
    a tower to receive the grain from the dryer;
    a control system including a controller, position sensors in communication with the controller to sense levels of the received grain at various locations within the tower, and temperature sensors in communication with the controller to sense temperatures of the received grain at various locations within the tower;
    a ventilation system to cool and dry the received grain; and
    an extractor to extract cooled grain from the tower, wherein
    the control system controls the ventilation system and the extractor to maintain a transition zone within a volume of received grain, the transition zone being a cross-section of the volume of the received grain that is at a same temperature, wherein the control system maintains the transition zone by:
    maintaining a level of the received grain within predetermined locations within the tower,
    controls the ventilation system to provide ventilation air to cool and dry the received grain, and
    controls the extractor to extract the cooled grain.

9. The apparatus according to claim 8, wherein the transition zone is moved in a direction within the volume of received grain by providing the ventilation air and in an opposite direction by extracting the cooled grain.

10. The apparatus according to claim 8, wherein
the control system stops the ventilation system when the transition zone reaches a first position sensed by a first position sensor, and
the control system stops the extractor when the transition zone reaches a second position sensed by a second position sensor.

11. The apparatus according to claim 8, wherein
the control system controls receiving the grain from the dryer such that a temperature of the grain is within a first predetermined temperature range, and
the control system controls extracting the cooled grain such that a temperature of the cooled grain is extracted within a second predetermined temperature range.

12. The apparatus according to claim 9, wherein the controller processes temperatures of the received grain received by the temperature sensors at several locations within the volume of the received grain at periodic intervals.

13. A control system to process grain from a dryer, the control system comprising:
a controller;
a plurality of temperature sensors each providing a temperature at a location within a volume of received grain from the dryer to the controller;
a ventilation system to provide cooling air to the received grain; and
an extractor to extract cooled grain from the volume of received grain, wherein the control system controls the ventilation system and the extractor based on temperatures provided by the plurality of temperature sensors to maintain a transition zone within the volume of received grain, the transition zone being a cross-section of the volume of the received grain that is at a same temperature, wherein the control system maintains the transition zone by:
maintaining a level of the received grain within predetermined locations within the tower,
controls the ventilation system to provide ventilation air to cool and dry the received grain, and
controls the extractor to extract the cooled grain.

14. The control system according to claim 13, wherein the transition zone is moved in a direction within the volume of received grain by providing the ventilation air and in an opposite direction by extracting the cooled grain.

15. The control system according to claim 13, wherein
the control system stops the ventilation system when the transition zone reaches a first position sensed by a first position sensor, and
the control system stops the extractor when the transition zone reaches a second position sensed by a second position sensor.

16. The control system s according to claim 13, wherein
the control system controls receiving the grain from the dryer such that a temperature of the grain is within a first predetermined temperature range, and
the control system controls extracting the cooled grain such that a temperature of the cooled grain is extracted within a second predetermined temperature range.

17. The control system according to claim 13, wherein the controller processes temperatures of the received grain received by the temperature sensors at several locations within the volume of the received grain at periodic intervals.

* * * * *